US008104288B2

(12) United States Patent
Woodcock et al.

(10) Patent No.: US 8,104,288 B2
(45) Date of Patent: Jan. 31, 2012

(54) EFFUSION COOLING TECHNIQUES FOR COMBUSTORS IN ENGINE ASSEMBLIES

(75) Inventors: Gregory O. Woodcock, Mesa, AZ (US);
Timothy Ertz, Scottsdale, AZ (US);
Brian Koch, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 660 days.

(21) Appl. No.: 12/238,174

(22) Filed: Sep. 25, 2008

(65) Prior Publication Data
US 2010/0071379 A1    Mar. 25, 2010

(51) Int. Cl.
F02C 3/14    (2006.01)
(52) U.S. Cl. ............................. 60/755; 60/752
(58) Field of Classification Search .................... 60/752, 60/754–760
See application file for complete search history.

(56) References Cited

U.S. PATENT DOCUMENTS

| | | | | |
|---|---|---|---|---|
| 2,654,219 A * | 10/1953 | Zaba | ................................ | 60/752 |
| 3,369,363 A * | 2/1968 | Campbell | ........................ | 60/757 |
| 3,422,620 A * | 1/1969 | Fantozzi et al. | .................. | 60/755 |
| 3,623,711 A * | 11/1971 | Thorstenson | .................... | 60/754 |
| 5,259,182 A * | 11/1993 | Iwai et al. | ......................... | 60/777 |
| 5,261,223 A * | 11/1993 | Foltz | ................................ | 60/804 |
| 5,323,602 A * | 6/1994 | Defever | ........................... | 60/804 |
| 5,398,509 A * | 3/1995 | North et al. | ...................... | 60/755 |
| 5,758,504 A * | 6/1998 | Abreu et al. | ..................... | 60/754 |
| 6,170,266 B1 | 1/2001 | Pidcock et al. | | |
| 6,427,446 B1 | 8/2002 | Kraft et al. | | |
| 6,620,457 B2 | 9/2003 | Farmer et al. | | |
| 6,955,053 B1 | 10/2005 | Chen et al. | | |
| 7,093,439 B2 | 8/2006 | Pacheco-Tougas et al. | | |
| 7,146,816 B2 * | 12/2006 | Anderson et al. | ................ | 60/772 |
| 7,269,957 B2 | 9/2007 | Martling et al. | | |
| 7,302,801 B2 | 12/2007 | Chen | | |
| 2005/0241316 A1 * | 11/2005 | Nguyen et al. | ................... | 60/772 |
| 2006/0037323 A1 * | 2/2006 | Reynolds et al. | ................ | 60/754 |
| 2007/0012048 A1 | 1/2007 | Buret et al. | | |
| 2007/0169484 A1 * | 7/2007 | Schumacher et al. | ........... | 60/754 |
| 2007/0271926 A1 | 11/2007 | Alkabie | | |
| 2008/0134683 A1 | 6/2008 | Foale | | |

* cited by examiner

Primary Examiner — Ehud Gartenberg
Assistant Examiner — Lorne Meade
(74) Attorney, Agent, or Firm — Ingrassia Fisher & Lorenz, P.C.

(57) ABSTRACT

A combustor for an engine assembly includes a cylindrical wall forming a combustion chamber in which an air and fuel mixture is combusted; and a plurality of effusion cooling holes formed in the cylindrical wall, the plurality of effusion cooling holes oriented such that cooling air flowing therethrough cools the cylindrical wall with effusion cooling, convection cooling, and impingement cooling.

15 Claims, 3 Drawing Sheets

EFFUSION COOLING TECHNIQUES FOR COMBUSTORS IN ENGINE ASSEMBLIES

STATEMENT REGARDING FEDERALLY SPONSORED RESEARCH OR DEVELOPMENT

This invention was made with Government support under contract number DAAE07-96-C-A002 awarded by the US Army. The Government has certain rights in this invention.

TECHNICAL FIELD

The present invention generally relates to combustors for use in turbine engine assemblies and more specifically, to combustors for use in turbine engines assemblies having improved temperature characteristics.

BACKGROUND

Gas turbine engine assemblies generally include a combustor that receives pressurized air from a compressor and fuel from a fuel injector. The resulting fuel-air mixture is ignited to produce high temperature combustion gases, which then flow downstream into a turbine for energy extraction. The high temperature gases in the combustor create a temperature environment that may limit the useful operating time, and ultimately, the component life of the combustor and the other components of the engine. Accordingly, cooling of the engine, particularly the combustor, is desired.

Conventional systems and methods for cooling the combustor, such as louvers, have been met with mixed success, at best. It has been found that the introduction of cooling air into the upstream end of the combustor may not be as effective as is normally desirable for a given flow of air. As such, the amount of air for use in the primary combustion process is limited, thereby giving rise to less than efficient combustion. Additionally, carbon deposition may occur, and it is sometimes difficult to limit harmful emissions, e.g., carbon monoxide, unburned hydrocarbons, smoke, and the oxides of nitrogen. These emissions can accumulate and be swept out of the combustion chamber in the cooling air film before the emissions have a chance to be consumed by the combustion process.

Effusion cooling has also been utilized. Effusion cooling generally involves an array of small holes in the combustor wall that admit a layer of cooling air to the inner surfaces of the combustor. The cooling air buffers the inner surfaces from the hot gases of the combustion process. However, conventional effusion cooling techniques may not provide sufficient cooling of the combustor for a given amount of cooling air Accordingly, it is desirable to provide engine assemblies having combustors with improved temperature management, and it is particularly desirable to provide more effective and efficient effusion cooling techniques for combustors. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a combustor for an engine assembly includes a cylindrical wall forming a combustion chamber in which an air and fuel mixture is combusted; and a plurality of effusion cooling holes formed in the cylindrical wall, the plurality of effusion cooling holes oriented such that cooling air flowing therethrough cools the cylindrical wall with effusion cooling, convection cooling, and impingement cooling.

In accordance with another exemplary embodiment, a combustor for an engine assembly includes a cylindrical wall forming a combustion chamber in which an air and fuel mixture is combusted; and a plurality of effusion cooling holes formed in the cylindrical wall, wherein each of the plurality effusion cooling holes is oriented at an angle of about 60° to about 120° relative a meridinal line of the combustion chamber and at an angle of about 10° to about 30° relative to the cylindrical wall.

In accordance with yet another exemplary embodiment, an engine assembly includes a compressor section configured to supply compressed air; a combustor section configured to received the compressed air, to mix the compressed air with fuel, and to ignite the air-fuel mixture to produce combustion gases, the combustor section comprising a combustor with a cylindrical wall and a plurality of effusion cooling holes formed in the cylindrical wall, the plurality of effusion cooling holes oriented such that cooling air flowing therethrough cools the cylindrical wall with effusion cooling, convection cooling, and impingement cooling; a scroll assembly coupled to the combustor section and configured to receive the combustion gases; and a turbine section coupled to the scroll assembly and configured to receive the combustion gases from the scroll assembly and to extract energy from the combustion gases.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the application and uses of exemplary embodiments. Furthermore, there is no intention to be bound by any theory presented in the preceding background or the following detailed description.

Broadly, the exemplary embodiments discussed herein provide cooling schemes for combustors of gas turbine engine assemblies. More particularly, the walls of the combustors are provided with effusion cooling holes for supplying a film of cooling air to inner surfaces. In various embodiments, the effusion cooling holes have an angle of approximately 90° relative to the meridinal line of the of the combustor with a relatively small angle relative to the wall of the combustor. In this way, the cooling air flow cools the combustor with effusion cooling, impingement cooling, and convection cooling. Embodiments discussed herein may find beneficial use in many industries and applications, including aerospace, automotive and other land-based propulsion, electricity generation, and in aircraft auxiliary power units, including land based automotive vehicles, and electricity generation.

Figure 1:
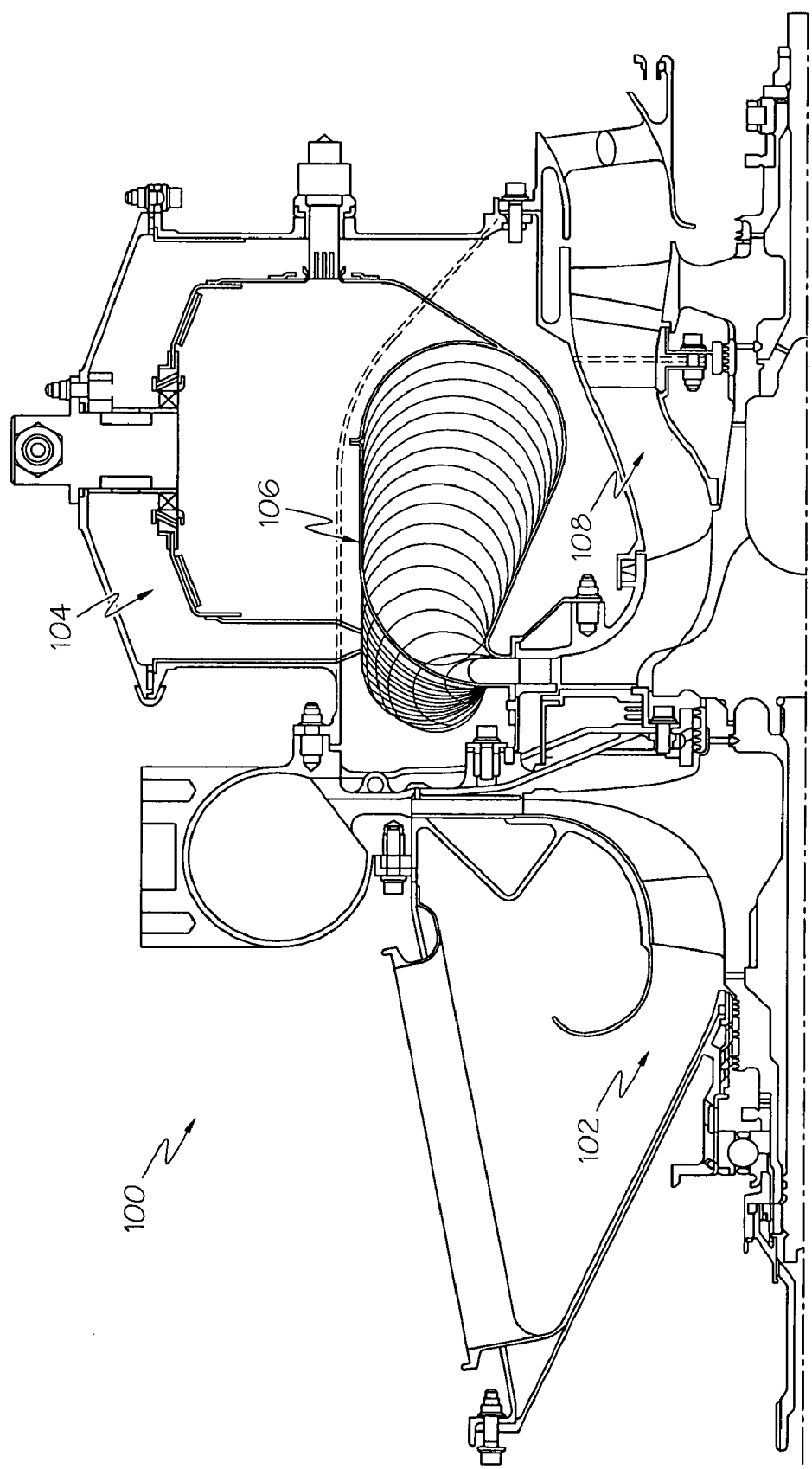
FIG. 1 is a schematic representation of an engine assembly in accordance with an exemplary embodiment.

FIG. 1 is a schematic representation of an engine assembly 100 in accordance with an exemplary embodiment. In the depicted embodiment, the engine assembly 100 includes a compressor section 102, a combustor section 104, a scroll assembly 106, and a turbine section 108. The combustor section 104 receives compressed air from the compressor section 102 and fuel from a fuel injector (not shown). The resulting fuel-air mixture is ignited by an igniter (not shown) to produce high energy combustion gases. The combustion gases flow from the combustor section 104, through the scroll assembly 106, and to the turbine section 108 for energy extraction.

Figure 2:
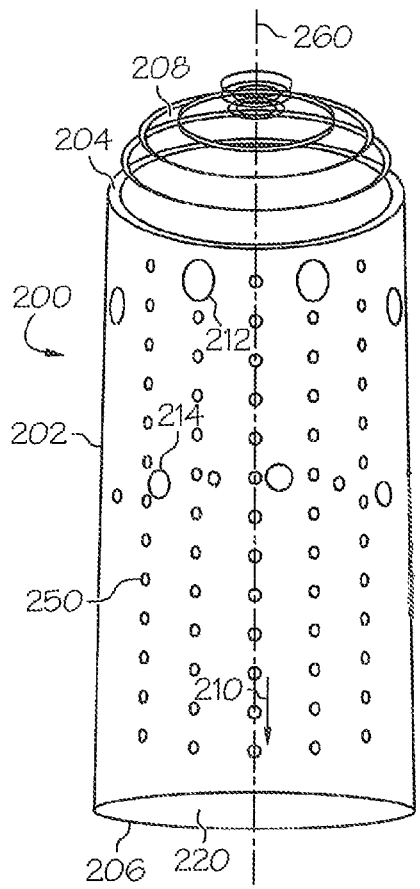
FIG. 2 is a side view of a combustor of the engine assembly of FIG. 1 in accordance with the exemplary embodiment.

FIG. 2 is a side view of an exemplary combustor 200 (e.g., combustor of the combustor section 104 of FIG. 1). The combustor 200 has a cylindrical wall 202 forming a combustion chamber 220 with an inlet end 204 for admitting the air-fuel mixture and an outlet end 206 that is coupled to an inlet of the scroll assembly (see, e.g., scroll assembly 106 FIG. 1) in communication with a turbine (e.g., turbine section 108). A dome 208 covers the inlet end 204. The combustor 200 includes a number of primary holes 212 and dilution holes 214 that admit additional air into the combustion chamber 220 to support the combustion process. As the air-fuel mixture is combusted, the combustion gases move downstream, as indicated by arrow 210.

In this exemplary embodiment, the combustor 200 is a can combustor, although aspects of the embodiments discussed herein are also applicable to other types of combustors such as multi-can and can-annular arrangements, and engine components in general. In one embodiment, the combustor 200 has a length of, for example, 14.5 inches, although other sizes can be provided. The cylindrical wall 202 may be fabricated by typical forming methods using thin sheet metal with an exemplary thickness typically from about 0.02 to about 0.07 inch. A centerline 260 is also shown in FIG. 2.

As discussed above, in many applications, cooling is beneficial to prevent issues resulting from the high temperatures of the combustion gases. In one exemplary embodiment, effusion (or "film") cooling holes 250 are provided in the cylindrical wall 202. The effusion cooling holes 250 are generally relatively small, closely spaced holes that permit compressed air to pass through the cylindrical wall 202 of the combustor 200 of to supply a layer of cooling air to the hot side. In particular, the cooling air serves to buffer the hot sides from the combustion gases, as well as to convectively cool the walls as the air passes through and to cool with impingement as the air strikes an opposing wall, which is discussed in greater detail below. The effusion cooling holes 250 may be created using various processes, including drilling techniques such as electrical-discharge machining (EDM), stationary percussion laser machining and percussion on-the-fly laser drilling or with complex casting techniques.

The density of the effusion cooling holes 250 and the size of the effusion cooling holes 250 may vary, for example, according to the operating temperatures of combustor 200 and the amount of cooling that is needed, for example, to maintain a particular operating temperature. Typically, the density may vary from about 10 to about 60 holes per square inch of surface area. Any suitable spacing may be used, so long as efficient cooling is imparted to combustor 250. Typically, the effusion cooling holes 250 are round, although other shapes may be useful. For example, the effusion cooling holes 250 may be oval, egg-shaped or tapered. Other embodiments could use holes with cross sections of varying size, such as "fan" shaped (i.e., hole flow area increases from the hole inlet to the hole exit, to reduce coolant velocity). Typically, the diameter of effusion cooling holes 250 may vary from about 0.01 to about 0.04 inch.

Figure 3:
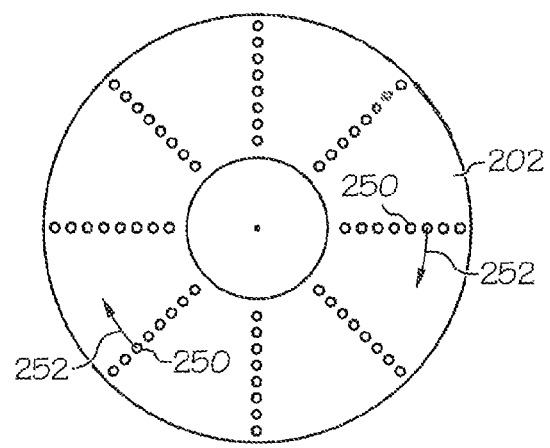
FIG. 3 is a view in an axial direction of the upstream end of the exemplary combustor of FIG. 2.
Figure 4:
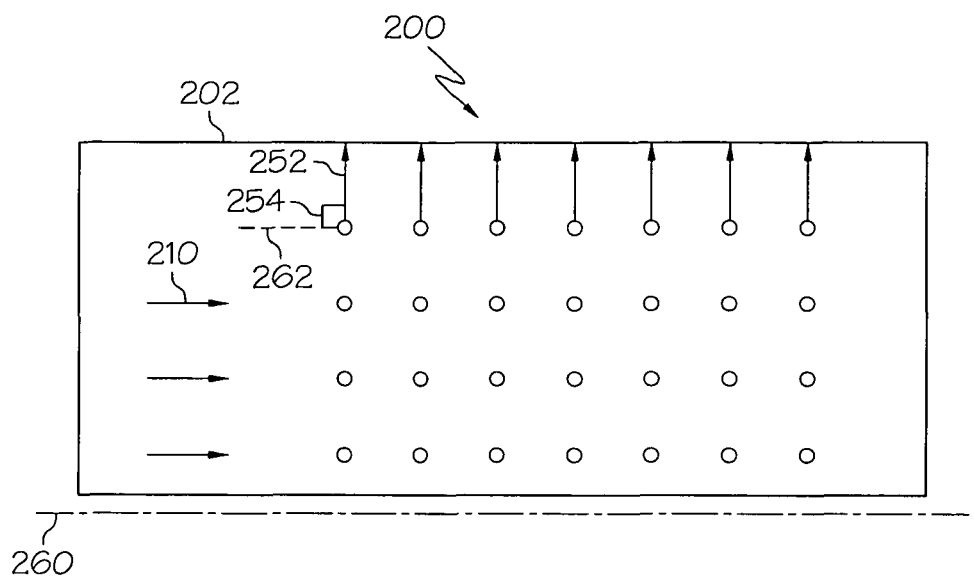
FIG. 4 is a partial side view of the exemplary combustor of FIG. 2.

Additional details of the combustor 200 are shown in FIG. 3, which is a view of the combustor 200 from the inlet end 204 with the primary and dilution holes 212, 214 omitted for clarity. The effusion cooling holes 250 may be oriented to advantageously improve cooling and reduce carbon formation. Particularly, the effusion cooling holes 250 may be oriented such that the cooling air exits the effusion cooling holes 250 in a circumferential direction to the centerline 260 of the combustor. Arrow 252 indicates the direction of cooling air flow. As most clearly shown in FIG. 4, which a plan view of a section of the effusion cooling holes 250, the cooling air 252 can exit the effusion cooling holes 250 at an angle 254 of approximately 90° to the combustion gases 210 and the centerline of the combustor 200. The angle 254 is also 90° relative to the meridinal line (e.g., line 262) of the combustor. In general, a meridinal line may refer to a curve on a surface of revolution formed by the intersection of the surface with a plane containing the axis of revolution. Generally, the combustion gases 210 flow in an axial direction that corresponds to the centerline of the combustor 200, although other directions are possible and can be accommodated accordingly. In one embodiment, this arrangement thereby facilitates the cooling air 252 to whirl about to create a gaseous film along the inner surface of the cylindrical wall 202. In further embodiments, the angle 254 can be, for example, approximately 60°-120°, and other configurations are possible as desired. In one embodiment, the holes are oriented such that the cooling whirl opposes any dome swirling. The single vortex of the tangential jet flow tends to reduce the combustion gases from infiltrating the effusion cooling layer, while keeping the effusion cooling layer attached to the surface to be cooled. This results in the cooling air 252 better resisting infiltration of hot exhaust gas within the combustor 200 as compared to prior art devices in which the air films flow in an essentially axial direction. Moreover, since cooling is more effective, less air is required for cooling and more air is available for direct use in the combustion process, thereby leading to a reduction in the formation of the oxides of nitrogen.

Figure 5:
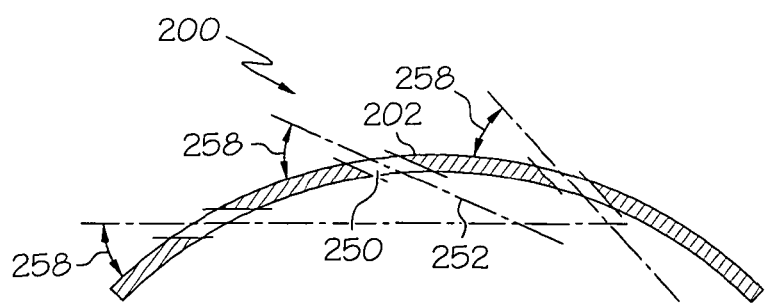
FIG. 5 is a partial cross-sectional view of the exemplary combustor of FIG. 2.

FIG. 5 is a partial cross-sectional view of the exemplary combustor 200. As shown in FIG. 5, each effusion cooling holes 250 may have a relatively acute angle 258 relative to the cylindrical wall 202. For example, the acute angle 258 may be 20°, although other angles such as 5°-30° may be provided based on cooling requirements and the diameter of the combustor 202. The acute angle 258 provides a relatively longer effusion cooling hole 250 though the cylindrical wall 202, and enables additional cooling via convection from the cylindrical wall 202 to the cooling air 252. Moreover, the acute angle 258 enables the cooling air 252 to impinge upon a portion of the inner surface of the cylindrical wall 202 to result in additionally advantageous impingement cooling. Larger angles 258 or smaller angles 254 may result in the cooling air 252 being swept downstream, combusted, and/or heated before reaching any portion of the inner surface of the cylindrical wall 202. The acute angle 258 configuration provides impingement cooling in a single wall combustor 200, in contrast to conventional engine components that require a double wall construction to achieve impingement cooling. The term "impingement cooling" may also include wall jet cooling and generally includes any stream of cooler air sliding along a wall surface at a velocity higher than the surrounding flow.

This results in a cooling flow with a higher heat transfer coefficient than otherwise would be there.

Additionally, the relatively large angle 254 (e.g., 90° in FIG. 4) in combination with the relatively small angle 258 advantageously results in the shortest path for the cooling air 252 to reach a corresponding inner surface of the cylindrical wall 202. In one embodiment, the combustor has an inner diameter of 6 inches and the angle 258 is 20°. In another embodiment, the combustor has a diameter of approximately less than 21 inches.

The net result can be a more effective cooling system with lower temperatures and/or more efficient cooling air requirements, thereby resulting in improved engine efficiency and/or improve durability. This creates increased cooling effectiveness, a more uniform surface temperature distribution, reduced coolant flow rates, decreased carbon formation, and higher engine efficiencies. These designs may also reduce manufacturing cost and weight by eliminating additional engine components, such as louvers, thermal barrier components, double walls for impingement, and/or other cooling mechanism. Such mechanisms may be provided in addition, however, in embodiments where more cooling is desired. Particularly, the orientation of the effusion cooling holes 250 provides at least three types of cooling: impingement cooling, effusion (or "film" cooling, and convection cooling. The particular placement, diameter, and orientation of effusion cooling holes 250 can be assisted by computation fluid dynamics (CFD) analysis.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A combustor for an engine assembly, comprising:
    a cylindrical wall forming a combustion chamber in which an air and fuel mixture is combusted; and
    a plurality of effusion cooling holes formed in the cylindrical wall, the plurality of effusion cooling holes oriented such that cooling air flowing therethrough cools the cylindrical wall with effusion cooling, convection cooling, and impingement cooling, wherein each of the plurality of effusion cooling holes is oriented such that the cooling air flowing therethough strikes an inner portion of the cylindrical wall cooling the inner portion as impingement cooling, wherein each of the plurality of effusion cooling holes is oriented at an angle of about 10° to about 30° relative to a tangent line on the cylindrical wall, the tangent line in a plane perpendicular to a centerline of the combustion chamber.

2. The combustor of claim 1, wherein each of the plurality of effusion cooling holes is oriented at an angle of about 60° to about 120° relative to a meridinal line of a surface of the combustion chamber.

3. The combustor of claim 1, wherein each of the plurality of effusion cooling holes is oriented at an angle of about 90° relative to a centerline of the combustion chamber.

4. The combustor of claim 1, wherein each of the plurality of effusion cooling holes is oriented at an angle of about 20° relative to a tangent line on the cylindrical wall, the tangent line in a plane perpendicular to a centerline of the combustion chamber.

5. The combustor of claim 1, wherein the combustion chamber is a can combustion chamber.

6. A combustor for an engine assembly, comprising:
    a cylindrical wall forming a combustion chamber in which an air and fuel mixture is combusted; and
    a plurality of effusion cooling holes formed in the cylindrical wall, wherein each of the plurality of effusion cooling holes is oriented at an angle of about 60° to about 120° relative to a meridinal line of the combustion chamber and at an angle of about 10° to about 30° relative to a tangent line on the cylindrical wall, the tangent line in a plane perpendicular to a centerline of the combustion chamber, wherein the plurality of effusion cooling holes is oriented such that cooling air flowing therethrough cools the cylindrical wall with convection cooling and cools an inner portion of the cylindrical wall with effusion cooling and impingement cooling.

7. The combustor of claim 6, wherein each of the plurality of effusion cooling holes is oriented at an angle of about 90° relative to a centerline of the combustion chamber.

8. The combustor of claim 6, wherein each of the plurality of effusion cooling holes is oriented at an angle of about 20° relative to a tangent line on the cylindrical wall, the tangent line in a plane perpendicular to a centerline of the combustion chamber.

9. The combustor of claim 6, wherein each of the plurality of effusion cooling holes is oriented such that the cooling air flowing therethough strikes an inner portion of the cylindrical wall.

10. The combustor of claim 6, wherein the combustion chamber is a can combustion chamber.

11. An engine assembly, comprising:
    a compressor section configured to supply compressed air;
    a combustor section configured to received the compressed air, to mix the compressed air with fuel, and to ignite the air-fuel mixture to produce combustion gases, the combustor section comprising a combustor with a cylindrical wall and a plurality of effusion cooling holes formed in the cylindrical wall, the plurality of effusion cooling holes oriented such that cooling air flowing therethrough cools the cylindrical wall with effusion cooling, convection cooling, and impingement cooling, wherein each of the plurality of effusion cooling holes is oriented such that the cooling air flowing therethough strikes an inner portion of the cylindrical wall cooling the inner portion as impingement cooling;
    wherein each of the plurality of effusion cooling holes is oriented at an angle of about 10° to about 30° relative to a tangent line on the cylindrical wall, the tangent line in a plane perpendicular to a centerline of the combustor;
    a scroll assembly coupled to the combustor section and configured to receive the combustion gases; and
    a turbine section coupled to the scroll assembly and configured to receive the combustion gases from the scroll assembly and to extract energy from the combustion gases.

12. The engine assembly of claim 11, wherein each of the plurality of effusion cooling holes is oriented at an angle of about 60° to about 120° relative to a meridinal of the cylindrical wall.

13. The engine assembly of claim 11, wherein each of the plurality of effusion cooling holes is oriented at an angle of about 90° relative to a centerline of the cylindrical wall.

14. The engine assembly of claim 11, wherein each of the plurality of effusion cooling holes is oriented at an angle of about 30° relative to a tangent line on the cylindrical wall, the tangent line in a plane perpendicular to a centerline of the combustor.

15. The engine assembly of claim 11, wherein the combustor is a can combustor.

* * * * *

UNITED STATES PATENT AND TRADEMARK OFFICE
CERTIFICATE OF CORRECTION

PATENT NO.         : 8,104,288 B2
APPLICATION NO.    : 12/238174
DATED              : January 31, 2012
INVENTOR(S)        : Woodcock et al.

Page 1 of 1

It is certified that error appears in the above-identified patent and that said Letters Patent is hereby corrected as shown below:

Column 1, line 8, "DAAE07-96-C-A002" should be changed to --W56HZV-06-C-0173--.

Signed and Sealed this
Tenth Day of April, 2012

David J. Kappos
*Director of the United States Patent and Trademark Office*